Figure 1:
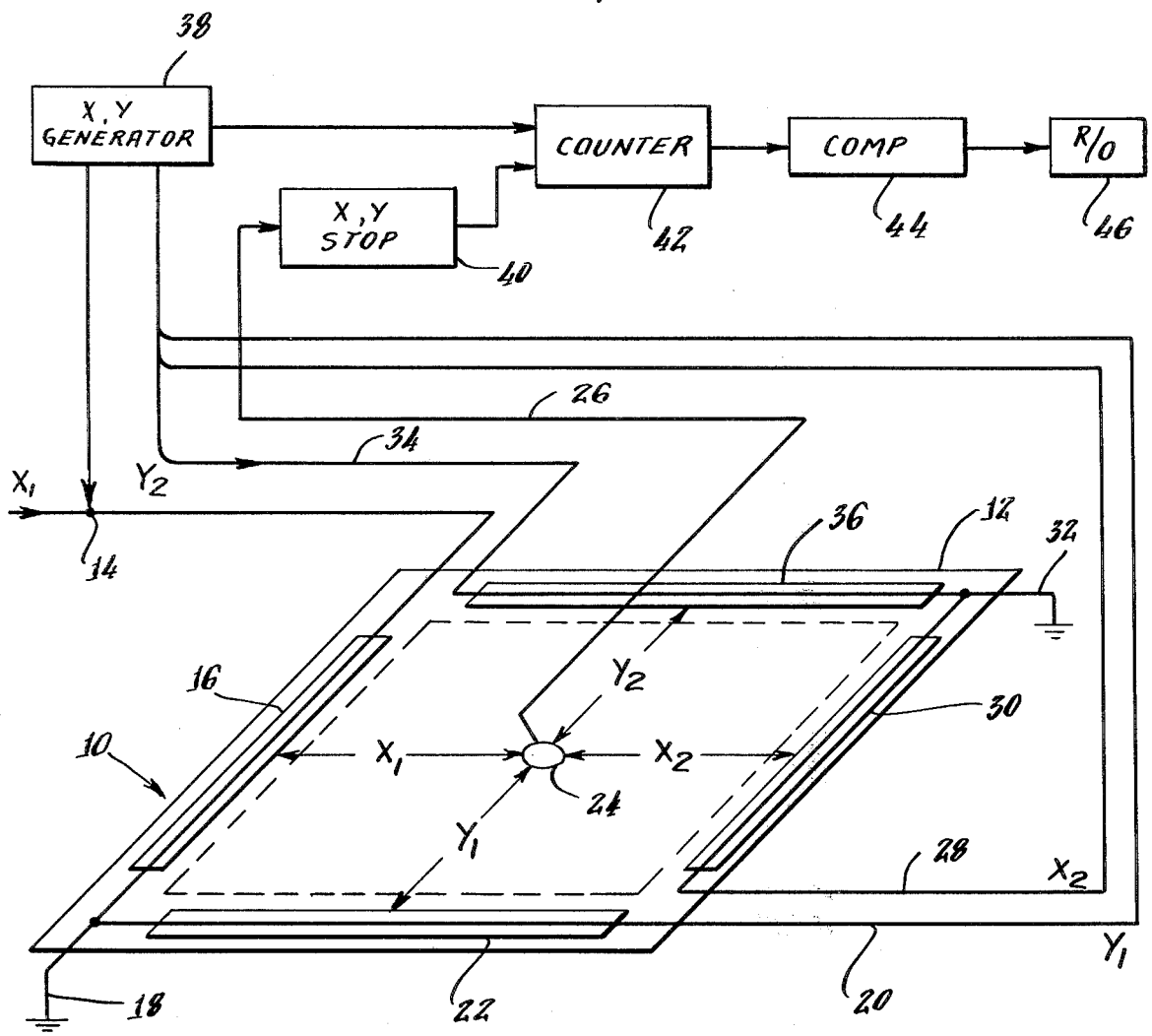

United States Patent [19]

Snyder et al.

[11] 4,018,989
[45] Apr. 19, 1977

[54] POSITION COORDINATE DETERMINATION DEVICE

[75] Inventors: Edward J. Snyder, Trumbull; Stephen L. Domyan, Norwalk, both of Conn.

[73] Assignee: Summagraphics Corporation, Fairfield, Conn.

[22] Filed: Dec. 24, 1975

[21] Appl. No.: 644,035

[52] U.S. Cl. .................................. 178/18; 178/19
[51] Int. Cl.² .................................. G08C 21/00
[58] Field of Search .............. 340/347 CC; 33/1 M, 33/1 P; 181/111, 112, 125; 178/18, 19, 20

[56] References Cited

UNITED STATES PATENTS

| | | | |
|---|---|---|---|
| 3,121,955 | 2/1964 | King | 33/1 P |
| 3,699,439 | 10/1972 | Turner | 33/1 M |
| 3,846,580 | 11/1974 | Brenner | 178/19 |
| 3,904,821 | 9/1975 | Whetstone et al. | 178/19 |

Primary Examiner—Thomas A. Robinson
Attorney, Agent, or Firm—Daniel M. Rosen

[57] ABSTRACT

A position coordinate determination device employing duodatum digitizations for each coordinate of a pair of respective coordinates and a ratiometric proportionality calculation for calculating a corrected coordinate digitization value in each measured coordinate.

10 Claims, 2 Drawing Figures

POSITION COORDINATE DETERMINATION DEVICE

THE INVENTION

This invention relates to position determination devices and more particularly, to accuracy and linearity improvement in position determination devices employing time scale digitization.

Graphical data devices requiring position and location are commonly employed in such areas as facsimile transmission and computer data input devices. Many forms of such devices have been proposed. A particularly accurate and desirable digitization device is described in U.S. Pat. No. 3,846,580 issued Nov. 5, 1974 and U.S. Pat. No. 3,904,821 issued Sept. 9, 1975, both assigned to the assignee of the present invention. In each of those systems, coordinate digitization is effected by employing strain wave vibrational mode transmission and reception. In each case, a magnetostrictively induced strain wave is placed into a data surface by means of a suitable generation device. The time required to propagate the strain wave from the generating device to a pick-up is digitized. This digitization represents the datum corresponding to a coordinate position thereby locating a particular position. Either the generator or the receptor may be movable, it being required only that one be movable with respect to the other. Other forms of graphical data devices employing similar types of time transmissions have been utilized for position determination and data input devices.

One of the difficulties encountered in systems of this type is realized when dealing with relatively large sized data surfaces. With systems that employ lengthy transmission media, such as the magnetostrictive wire, the character of the transmission media may well vary in terms of uniformity and electrical and mechanical characteristics. These nonuniformities may be due to manufacturing defects, temperature changes, handling defects, manufacturing problems, and other anomalies which become more apparent with larger increases in size.

The foregoing is particularly noticeable in the aforementioned U.S. patents where magnetostrictive transmission techniques are employed. However, such anomalies would also be noticed in any systems wherein temperature dependence or manufacturing variations create inaccuracies in the digitization due to the nature of the transmission systems employed.

One attempt to correct the foregoing inaccuracies in prior digitization systems involved the concept of segmenting the data surface into a plurality of smaller data surfaces, and coordinating the output signals to generate the appropriate correct coordinate. However, this is not a solution to the problem, but merely a technique which side steps the anomaly or reduces its effect. In addition, this segmenting technique requires the use of additional pick-ups or transmitters at various locations on the data surface, thereby increasing the cost and complexity of such units.

It is therefore the principal object of the present invention to provide a self-correcting position determination device which will automatically provide a corrected coordinate datum.

It is another object of the present invention to provide a self-correcting position determination device which will be entirely self-contained in the electronics employed within the unit and not require any special equipment or interpretation devices extraneous thereto.

It is another object of the present invention to provide a self-correcting determination device which will be employable with relative larger sized data surfaces while maintaining a high degree of linearity and a relatively low degree of temperature dependence.

The foregoing objects are achieved in accordance with the present invention by the provision of a self-correcting determination device including a data surface, wherein a first datum is generated representing a location of a position with respect to a first reference point on the data surface along a linear path, and a second datum representing the location of the same position with respect to a second reference on the data surface along the same linear path is also generated. These first and second datums are then manipulated by means of a calculation device performing a ratiometric proportionality operation in accordance with a predetermined constant for determining a corrected value. This operation is performed for both coordinate positions in a two coordinate system and continuously supplied to a suitable output device.

Figure 2:
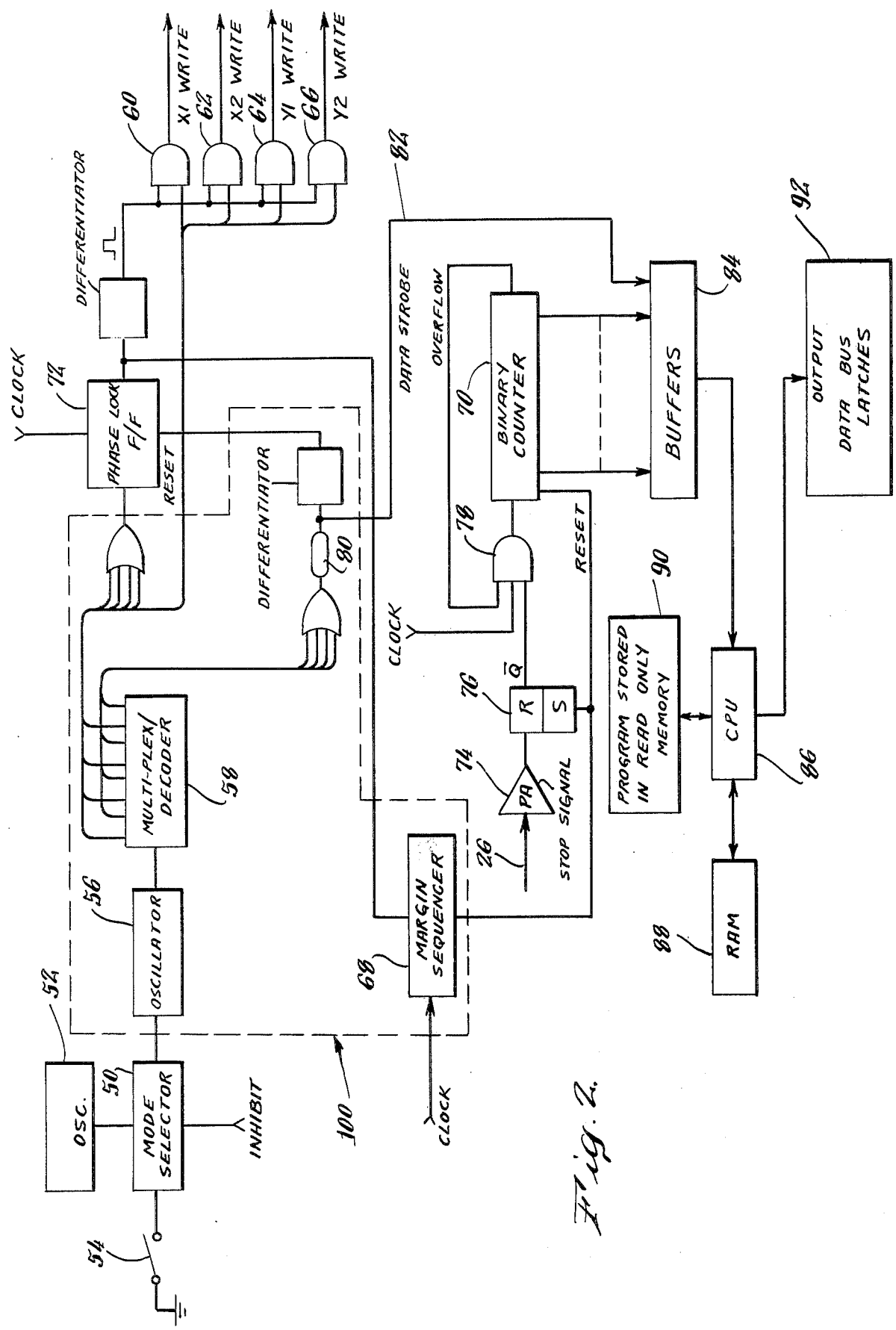

In order that the invention will be more clearly understood, it will now be disclosed in greater detail with reference to the accompanying drawings, wherein:

FIG. 1 is a simplified illustration, in block form, of a position coordinate determination device in accordance with one embodiment of the invention; and FIG. 2 is a block diagram of a logic circuit that may be employed for the system of FIG. 1.

Referring to FIG. 1, a generalized schematic illustrating the operation of a position determination device is shown. In the example illustrated, a data surface indicated generally within the dotted line section as element 10 is defined within the general confines of a tablet-like construction 12. As was described in the aforementioned U.S. Pat. Nos. 3,904,821 and 3,846,580, digitization occurs in a magnetostrictive tablet by means of pulsations applied along the respective coordinate axes. These pulses initiate the beginning or digitization sequence in associated electronic equipment, the digitization sequence being halted by the pick-up of a stop signal from a suitable pick-up located somewhere within the data surface 10. It will be appreciated, of course, that the converse may similarly be true, that is, the pick-up device may actually be a transmission device transmitting a pulse through the data surface 10 to suitable longitudinal pick-ups arranged along the peripheral area of the data surface 10.

For purposes of illustration and in the preferred embodiment employed in conjunction with the invention, the data tablet 10 consists of magnetostrictive transmissive material either in the form of a linear array of magnetostrictive wires arranged in orthogonal position as illustrated in U.S. Pat. No. 3,846,580, or as a magnetostrictive sheet as described in U.S. Pat. No. 3,904,821. In either case, the digitization pulse is supplied along respective first and second orthogonal coordinates defined by the X and Y locations. For example, the initial pulse $X_1$ is applied along the line 14 where it is coupled to the data tablet by means of a suitable coupling 16 and connected to a ground point 18. The $Y_1$ coordinate signal is applied along the line 20 coupled to suitable coupling 22 and also terminated in the common point 18. Appropriate pulsing of the $X_1$ and $Y_1$ signal lines result in an $X_1$ and $Y_1$ transmission to the pick-up device 24 which generates at its output line 26 a suitable stop signal. The stop signal turns off the digitization process which as initiated in each of the X and Y lines, respectively, by means of pulses applied along the lines. In accordance with the invention, self-correction is provided by the application of a second $X_2$ coordinate pulse along the input line 28 to the coupling means 30 and terminated in the ground position 32. The self-correction coordinate $X_2$ is positioned with respect to a second reference along the same linear path as the first $X_1$ coordinate. A second Y coordinate signal $Y_2$ is applied along the input line 34 to a suitable coupling means 36 to the common ground point 32.

In operation, the position coordinate for which digitization is desired is represented by the pick-up 24. The pick-up 24 may be manipulatable about the data surface 10 either manually or by means of XY coordinate motion arms, such as is described in U.S. Pat. No. 3,956,588, issued May 11, 1976 and assigned to the assignee of the present application, or by other means.

By way of illustration, typical operation of the device shown in FIG. 1 involves generation of a series of pulses from an XY generator illustrated generally as 38. Thus, by way of example, the X generated pulse appears along line 14 and provides a pulse along the X dimension indicated by $X_1$. Pick-up of the $X_1$ pulse by the pick-up 24 generates a stop pulse along line 26 to the stop pulse unit 40. Meanwhile, the X pulse from generator 38 is applied to the counter 42 for initiating a binary count. The stop pulse, when picked up by the transducer 24 and applied to the stop mechanism 40, stops the digitization of the counter 42. Thus, a digitization representative of the $X_1$ dimension in terms of the transmission time required for the pulse to propagate from the coupling means 16 to the pick-up 24 is placed in the counter 42. The same sequence of operations is effected in the $X_1$, $X_2$, $Y_1$ and $Y_2$ directions. In accordance with the invention a self-correction for the $X_1$ and $Y_1$ positions is generated by employing the $X_2$ and $Y_2$ factors. The datum represented by each of the dimensions $X_1$, $X_2$, $Y_1$ and $Y_2$ are generated along respective common linear paths with respect to fixed reference positions defined by the coupling means contiguous with each of those dimensions. Thus, for example, the fixed reference for dimension $X_1$ would be the coupling means 16, etc. The correction factor for the X dimension is derived for the $X_1$ and $X_2$ coordinates by reading out these factors from the counter 42 when they are stored therein but prior to the reading of the Y dimension datum. The correction is a ratiometric proportionality determined by a specific constant which relates to the size of the data surface. The ratiometric proportionality may be expressed in the following equation:

$$X(\text{corrected}) = \frac{X_1}{(X_1 + X_2)} K_1,$$

wherein $K_1$ represents a specific constant determined by the size of the tablet.

The Y correction is computed in precisely the same manner. That is to say:

$$Y(\text{corrected}) = \frac{Y_1}{(Y_1 + Y_2)} K_2,$$

wherein $K_2$ represents a specific constant determined by the size of the tablet.

The computation is effected by means of the calculator device 44 which may be any standard computer chip, or the like. Preferably, the X correction is calculated first and stored. Then the Y correction is calculated and stored. Upon successful completion of the storage of the Y calculation, both the X and Y corrected values are read out onto a read-out bus indicated generally as 46.

In a typical configuration wherein a data tablet may be required to have 0.005 inch resolution, and wherein the tablet is 48 inches along a particular dimension, such as the X dimension, resolution would in that case demand 200 lines to the inch. In such a situation, the constant factor K would be 9600 i.e. (48 × 200). Thus, if the pick-up 24 in FIG. 1 is positioned at the precise center of the tablet, and the $X_1$ reading is 4805 and the $X_2$ reading is 4807, then the correction for X would be calculated at 4805 ÷ (4805 + 4807) × 9600 which would equal 4799. Thus, although an incorrect reading of 4805 appeared on the $X_1$ dimension then an incorrect reading of 4807 on the $X_2$ dimension, the corrected reading results in 4799, a significant improvement in accuracy. The same correction calculations would, of course, be evidently applicable in the Y dimension as well. It is therefore apparent that variations in linearity for large tablets caused by transmission media anomalies such as wire conditions or nonuniformity in wire, which causes changes in its character, and other variations due to length, temperature, processing defects, etc. are compensated for. The correction system would, in addition, have absolute accuracy and zero temperature dependence. The digitization techniques for corrected X and Y values are carried out continuously, as is the nature of the operation. The ratios are therefore calculated successively upon each successive reading of X and Y and variations in both long and short term characteristics are completely cancelled.

Referring now to FIG. 2, a more detailed explanation of the electronic systems utilized in conjunction with FIG. 1 is set forth. As shown in FIG. 2 a mode selection unit 50 utilizes either an oscillator input 52 or a single triggered input 54 for the generation of a series of pulses derived from the oscillator 56 which are provided through the multiplexer decoder unit 58. The multiplexer decoder unit separates the signals into $X_1$, $X_2$, $Y_1$ and $Y_2$ control signals, after suitable gating and pulse shaping, through the respective gates 60, 62, 64 and 66. As noted in FIG. 1, certain margin spacing exists between the coupling units representing the X and Y pulse generation lines and the edges of the data surface 10. This spacing is compensated for by means of the margin sequencer unit 68, causing an appropriate offset in the binary counter 70. The binary counter thus starts in accordance with the occurrence of the pulse from the output of phase lock flip-flop 72 which responds to the appearance of any of the X and Y pulses from the multiplexer 58, passed through the margin sequencer 68 for the reasons set forth above, and initiating the start of the binary counter 70. The appearance of the pulse at the pick-up 24 causes the application of the pulse along line 26 to the pre-amp 74 and the RS flip-flop 76, shutting off the gate 78 and disabling the clock to the binary counter 70. After an appropriate delay set by delay 80, a data strobe pulse is passed along line 82 to the temporary storage unit 84.

The temporary storage unit 84, which may be tri-state buffers or other suitable digital holding circuitry, responds to the strobe pulse and transfers the data from the binary counter. That data, representing a particular datum, such as for example the datum represented by the $X_1$ dimension in FIG. 1 with respect to the fixed reference position 16, is in turn passed from the unit 84 in further response to the data strobe pulse to the CPU 86 where it is stored in the random access memory 88 in accordance with the program stored in the read-only memory 90. Next the $X_2$ dimension datum is produced in the same manner, the data strobe acting to transfer the next datum represented by the $X_2$ dimension through the buffers into the CPU 86. In accordance with the program stored in the read-only memory 90, the data position $X_1$ is retrieved from the random access memory and processed in the CPU 86 in accordance with the formula relationship set forth above. The constant, prestored in the read-only memory 90, is retrieved from the memory in accordance with the program also stored in the read-only memory 90 and is acted upon in the CPU to produce the corrected X value. The corrected value is then stored back in the random access memory. Further, although shown as discrete components, each function performed by the units enclosed within the block 100 may be physically embodied as a single integrated chip and also may be operated under control of the programmed CPU 86.

Next the Y calculations are performed in exactly the same manner. The $Y_1$ datum is generated, transferred via the units 84 to the random access memory. The $Y_2$ datum is generated and transferred into the CPU and a correction value calculated for $Y_1$ and $Y_2$ datum in the same manner as the $X_1$ and $X_2$ datum calculated in X correction value. When the Y correction value has been calculated, the read-only memory program acts to transfer the X corrected and Y corrected values out of the CPU into the data bus output latches 92 for utilization as the corrected X and corrected Y digitization. The ultimate use of the digitization in corrected form may be employed for any sequence of operation requiring the digitizations of continuous or discontinuous position sensing of the pick-up 24 with respect to the data surface. These utilizations are fully set forth in the aforementioned U.S. Pat. Nos. 3,904,821 and 3,846,580. The crystal controlling the repetition rate of the clock signals employed in the counter must correspond to the highest resolution. Thus, if a 0.005 inch resolution is employed, it is preferable to use a crystal frequency of at least 40 megahertz in order to achieve a pulse sequence sufficient to handle such resolution.

By way of example, the CPU can be an Intel Type 8080, the RAM an Intel Type 8111, and the ROM an Intel Type 8302.

Although magnetostrictive digitization systems have been described for use with the present invention, it will be understood that other forms of digitization techniques may be employed. Thus, for example, the system may be employed with crystal generation or digitization signals employed for position determination or with optical, sonic, sliding scale, or any system wherein linearity, temperature dependence compensation is desired and wherein greater accuracy is a significant criteria.

What is claimed is:

1. A self-correcting position determination device comprising a data surface, means for generating a first datum representing the location of a position with respect to a first reference on said data surface along a linear path, means for generating a second datum representing the location of said position with respect to a second reference on said data surface along said linear path, and means for combining said first and second datum to produce a third datum representative of the true location of said position on said data surface.

2. The device of claim 1 wherein said means for generating includes a signal generator coupled to said data surface at said first and second references, a time digitization means turning on in response to a signal supplied by said signal generator, and a pick-up means located at said position and responsive to the transmission of said signal through said data surface to said pick-up means for turning off said time digitization means.

3. The device of claim 1 wherein said means for generating includes a first generating means and second generating means positioned along opposite sides of said data surface along a common plurality of parallel linear paths for defining a first coordinate, and third and fourth generating means positioned along opposite sides of said data surface along a common plurality of parallel linear paths for defining a second coordinate.

4. The device of claim 3 wherein said means for generating includes a signal generator coupled to said data surface at said first and second references, a time digitization means turning on in response to a signal supplied by said signal generator, and a pick-up means located at said position and responsive to the transmission of said signal through said data surface to said pick-up means for turning off said time digitization means.

5. The device of claim 1 wherein said device includes a read-only memory storing a sequence of steps for calculating said true position, a calculator for performing a first true position calculation from said first and second datum and a second true position calculation from a third and fourth datum corresponding to a coordinate orthogonal to said first coordinate, a random access memory for temporarily storing the results of a first coordinate true position, and a read-out means, said read-only memory reading said first and second true position out through said read-out means upon completion of said second true position calculation.

6. A self-correcting position determination device comprising a data surface and means for generating a corrected position coordinate corresponding to first and second orthogonal coordinates along respective axes for determining the location of said position, said means including first means for generating a first datum representing said position with respect to a first reference, second means for generating a second datum representing said position with respect to a second reference axially aligned with said first reference along one of said orthogonal axes, means for calculating a first true axial coordinate position from a ratiometric proportionality of said first and second datum, means for storing said first true axial coordinate position, third means for generating a third datum representing said position with respect to a third reference, fourth means for generating a fourth datum representing said position with respect to a fourth reference axially aligned with said third reference along the other of said orthogonal axes, means for calculating a second true axial coordinate position from a ratiometric proportionality of said third and fourth datum, means for storing said second true axial coordinate position, and means responsive to the storing of said first and second true axial coordinate positions for reading out said first and second true axial coordinate positions as the said corrected position coordinate.

7. The device of claim 6 wherein said means for generating includes a signal generator coupled to said data surface at said first and second references, a time digitization means turning on in response to a signal supplied by said signal generator, and a pick-up means located at said position and responsive to the transmission of said signal through said data surface to said pick-up means for turning off said time digitization means.

8. The device of claim 6 wherein said means for generating includes a first generating means and second generating means positioned along opposite sides of said data surface along a common plurality of parallel linear paths for defining a first coordinate, and third and fourth generating means positioned along opposite sides of said data surface along a common plurality of parallel linear paths for defining a second coordinate.

9. The device of claim 6 wherein said means for generating includes a signal generator coupled to said data surface at said first and second references, a time digitization means turning on in response to a signal supplied by said signal generator, and a pick-up means located at said position and responsive to the transmission of said signal through said data surface to said pick-up means for turning off said time digitization means.

10. The device of claim 6 wherein said device includes a read-only memory storing a sequence of steps for calculating said true position, a calculator for performing a first true position calculation from said first and second datum and a second true position calculation from a third and fourth datum corresponding to a coordinate orthogonal to said first coordinate, a random access memory for temporarily storing the results of a first coordinate true position, and a read-out means, and means for outputting said first and second true position to an output line upon completion of said second true position calculation.

* * * * *